(12) United States Patent
Yang

(10) Patent No.: US 6,501,666 B1
(45) Date of Patent: Dec. 31, 2002

(54) METHOD AND APPARATUS FOR MAGNETIC AMPLIFIER TO REDUCE MINIMUM LOAD REQUIREMENT

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 09/931,637

(22) Filed: Aug. 15, 2001

(51) Int. Cl.⁷ .......................... H02M 3/335; H02M 5/42
(52) U.S. Cl. ................... 363/17; 363/19; 363/91; 327/494
(58) Field of Search ........................ 363/17, 16, 19, 363/20, 95, 97, 98, 91, 82, 131, 132; 327/65, 494

(56) References Cited

U.S. PATENT DOCUMENTS

| | | | |
|---|---|---|---|
| 4,460,955 A | * | 7/1984 | Hattori et al. ............ 363/91 |
| 4,626,976 A | * | 12/1986 | Abe et al. ............... 363/19 |
| 4,642,743 A | | 2/1987 | Radcliffe |
| 4,675,615 A | | 6/1987 | Bramanti |
| 4,811,187 A | * | 3/1989 | Nakajima et al. .......... 363/25 |
| 4,931,920 A | | 6/1990 | Barker |
| 4,994,685 A | | 2/1991 | Mathison |
| 5,521,808 A | | 5/1996 | Marusik et al. |
| 5,612,862 A | | 3/1997 | Marusik et al. |
| 5,689,408 A | | 11/1997 | Song |

\* cited by examiner

Primary Examiner—Rajnikant B. Patel
(74) Attorney, Agent, or Firm—J.C. Patents

(57) ABSTRACT

This invention provides a method and apparatus for magnetic amplifier to reduce the minimum load requirement of power supply. The apparatus comprises a voltage-dropper and a current-limiter. Through the voltage-dropper and the current-limiter, the master output of the power supply is coupled to the output of magnetic amplifier. The differential voltage of the master output and the magnetic amplifier output decide the voltage of the voltage-dropper. The current-limiter limits the current flows from the master output to magnetic amplifier output. If the master output is no load and the magnetic amplifier is full load condition, a start-up current will flow from the master output to the output of magnetic amplifier via the voltage-dropper and the current-limiter. In the mean time, the start-up current will widen the pulse width of the PWM signal until the current-limiter limits the current. The maximum current of the current-limiter is assigned to maintain the minimum pulse width of the PWM signal. This minimum pulse width of the PWM signal ensures that the output of the magnetic amplifier is inside the regulation.

6 Claims, 5 Drawing Sheets

METHOD AND APPARATUS FOR MAGNETIC AMPLIFIER TO REDUCE MINIMUM LOAD REQUIREMENT

FIELD OF INVENTION

The present invention relates to a switching mode power supply. More particularly, the present invention relates to the magnetic amplifier of the switching mode power supply.

BACKGROUND OF THE INVENTION

A magnetic amplifier is typically used in switching mode power supply to act as a high efficiency post-regulator. Most multi-output PWM (pulse width modulation) power supplies can ensure only one master output under the precision regulation, in which the master output is under the feedback loop control. The rest of the outputs are open loop and may be regulated by passive devices such as common-mode inductor, etc. Therefore, a post regulator is needed if another accuracy output is required. The magnetic amplifier (MA) is a high efficiency post regulator for step-down (buck) power conversion. The output voltage of the MA is thus lower than the output voltage of the master output. Please refer to "Abraham I. Pressman "Switching Power Supply Design" McGraw-Hill Book Co., p381–p412 for the theory and operation of MA. FIG. 1 shows a circuit schematic of the PWM power supply that includes a MA. The PWM circuit controls the master output, and the MA circuit controls the MA output. FIG. 2 displays the waveform of the circuit shown in FIG. 1. Through the feedback loop of the MA, the error-amplifier U1 and transistor Q1 control the current Ib that flows in to the choke L1.

The magnetic-flux density of the choke L1 is biased to Bb by the current Ib, wherein Bb=0.4\*\*N\*Ib/lm. The choke L1 plays a role as an on/off switch. As long as Bb existed, the choke L1 is in off-state. After a voltage is applied to choke L1 for a period of time Tz, Bb will be reset to zero and choke L1 will change to on-state.

$Tz=Bb*N*Ae/Vp;$

N: turn numbers of L1; Ae: core area of L1; lm: magnetic path length of L1;

The MA output voltage Vom is $Vom=Vp*Ton/T;$

Where Ton=Tp−Tz and Tp is the pulse width of the PWM signal Vp. A minimum pulse width Tp is required for the MA to fit the specification. The pulse width Tp is controlled by the master feedback loop and is determined by the load condition of the master output Vol. In the case for Vol light load and Vom maximum load, the pulse width Tp might be too short to provide the regulated Vom. Therefore, a dummy load or a consumption of minimum load is needed in the master output Vol. However, the minimum load requirement does not meet the criteria of power management. Power management is a solution for saving power consumption of electronic equipment. Neither the minimum load nor the dummy load is a good approach. No load condition is common in a system that has power management, and the dummy load will decline the efficiency of the power conversion. For this reason, the magnetic amplifier is a high efficiency and low cost regulator, but it could be a good solution only if the minimum load requirement of the power supply can be reduced.

SUMMARY OF THE INVENTION

This invention provides a method and apparatus for a magnetic amplifier to reduce the minimum load requirement of power supply. The apparatus comprises a voltage-dropper and a current-limiter. Through the voltage-dropper and current-limiter, the master output of the power supply is coupled to the output of the magnetic amplifier. The differential voltage of the master output and the magnetic amplifier output decide the voltage of the voltage-dropper. The current-limiter limits the current flowing from the master output to the magnetic amplifier output. The voltage-dropper is connected in series with the current-limiter. Through the voltage-dropper and current-limiter, the master output of the power supply is linked to the output of the magnetic amplifier. The feedback loop of the master output controls the pulse width of PWM signal to regulate the master output. Through the regulation of the magnetic amplifier, the PWM signal produces another regulated output, such as the output of the magnetic amplifier. The master output is in no load condition and the magnetic amplifier is in full load condition. A start-up current will flow from the master output to the output of the magnetic amplifier via the voltage-dropper and the current-limiter. In the mean time, the start-up current will widen the pulse width of PWM signal until the current-limiter limits the current. The maximum current of the current-limiter is assigned to maintain the minimum pulse width of the PWM signal. Besides, the current-limiter provides over-load protection for the voltage-dropper. This minimum pulse width of the PWM signal ensures that the output of the magnetic amplifier is inside the regulation.

Advantageously, the method and apparatus for magnetic amplifier can reduce the minimum load requirement of power supply.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 3:
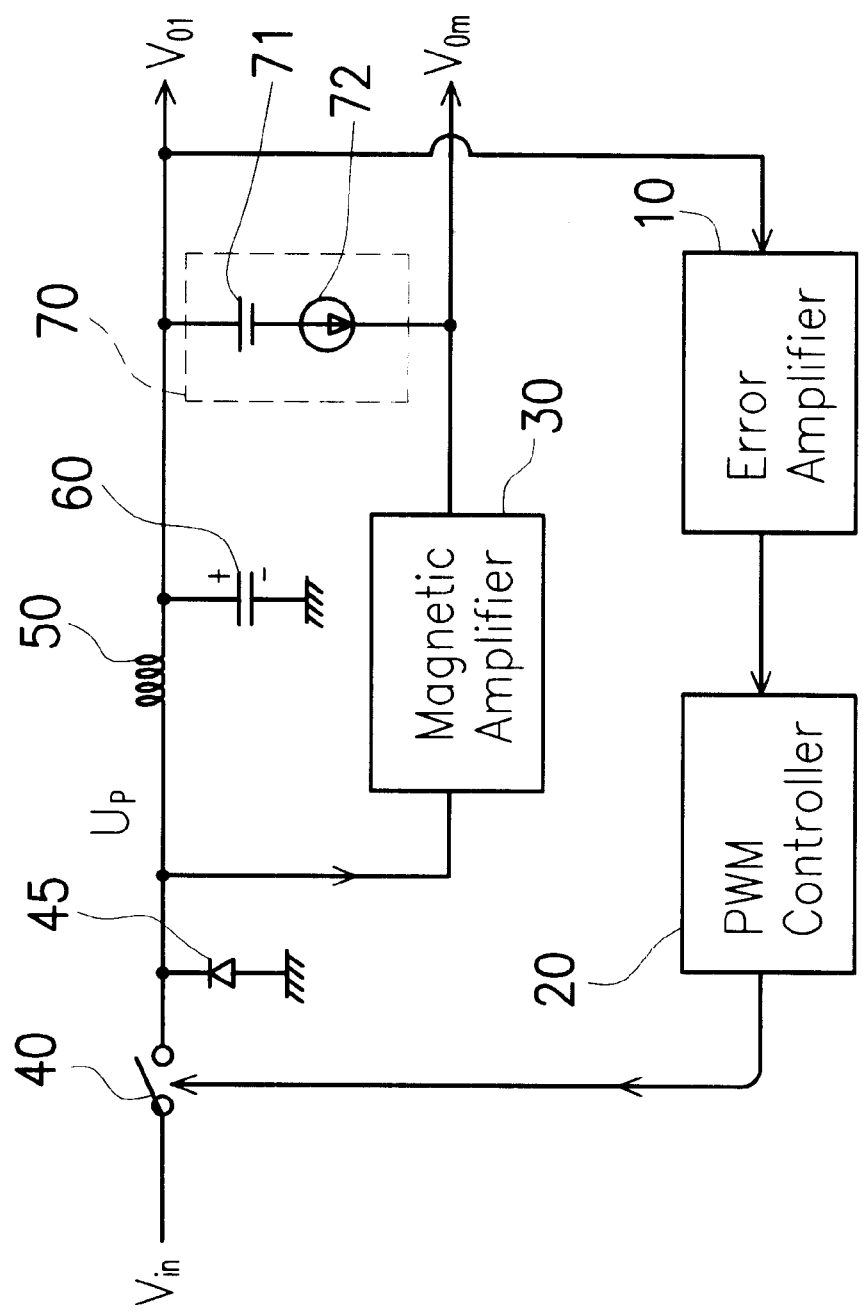
FIG. 3 schematically shows a method and apparatus for a magnetic amplifier to reduce the minimum load requirement of power supply according to one embodiment of the present invention.

FIG. 3 schematically shows a method and apparatus for a magnetic amplifier to reduce the minimum load requirement of power supply according to one embodiment of the present invention. The power supply includes an error amplifier 10, a PWM controller 20, a magnetic amplifier 30, a PWM switch 40, a wheeling diode 45, an inductor 50, a capacitor 60, and an apparatus 70. The apparatus 70 applies to reduce the minimum load requirement of power supply. The apparatus 70 comprises a voltage-dropper 71 and a current-limiter 72.

Figure 1:
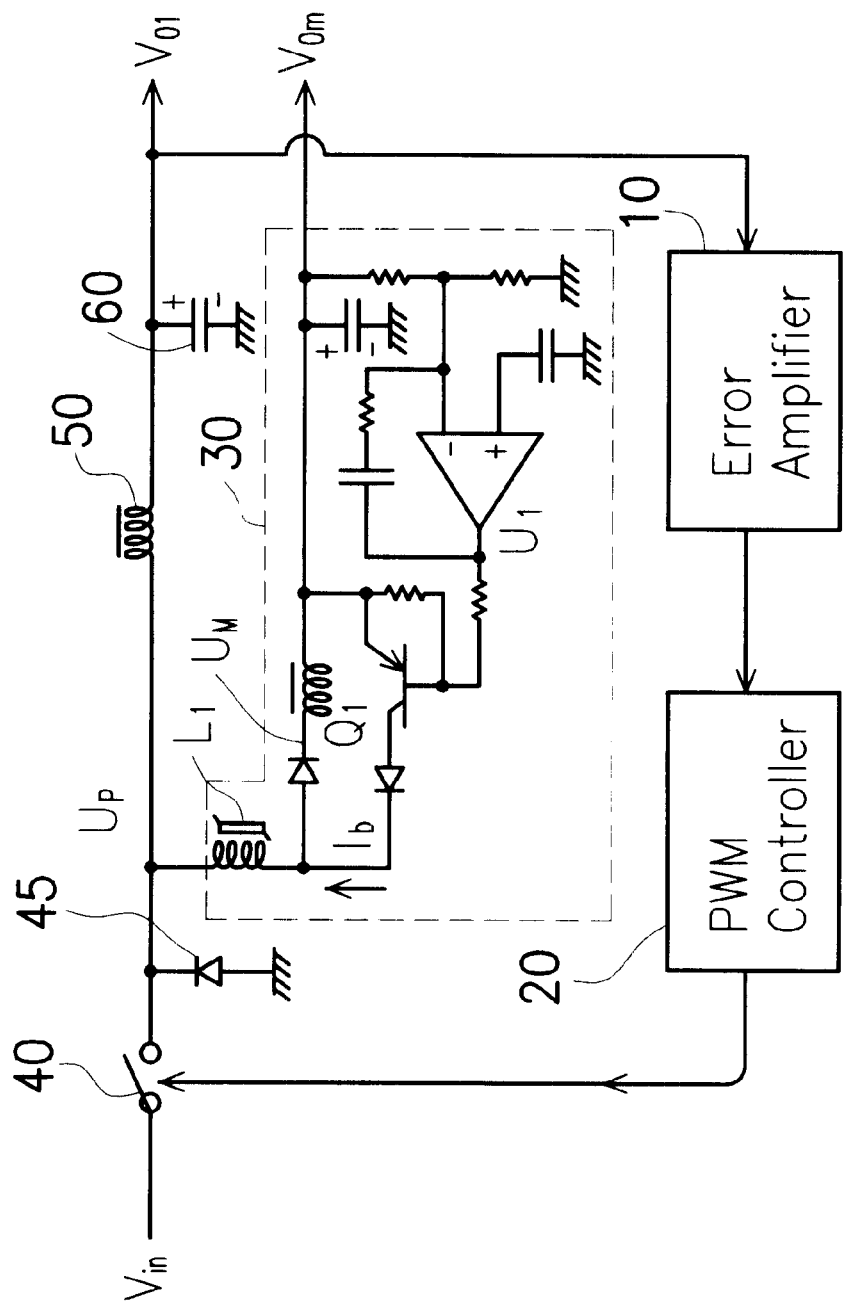
FIG. 1 shows the circuit schematic of the PWM power supply including a magnetic amplifier.
Figure 2:
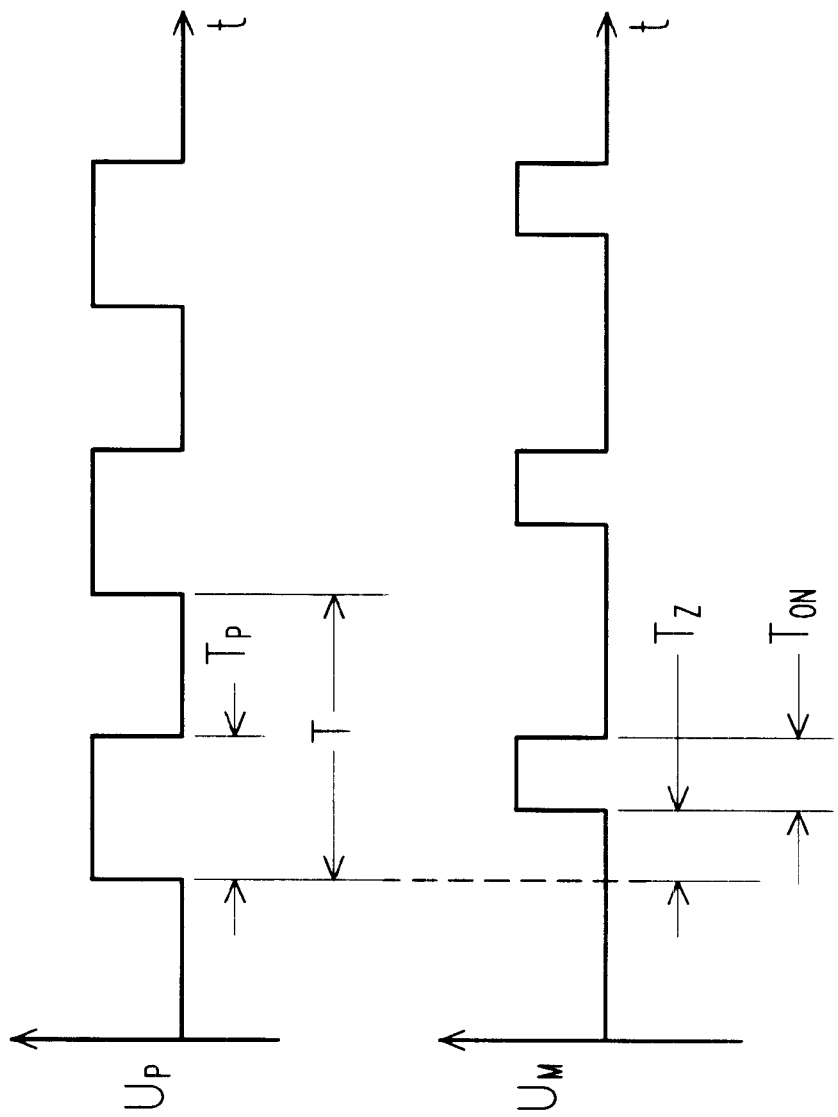
FIG. 2 displays the waveform of the FIG. 1 circuit.

The error amplifier 10, the PWM controller 20, the PWM switch 40, the wheeling diode 45, the inductor 50 and the capacitor 60 develop a PWM circuit. The master output Vol of the power supply is linked to the input of the error amplifier 10 to establish the feedback loop. The output of the error amplifier is connected to the PWM controller 20 to generate a gate-drive signal. The gate-drive signal drives the PWM switch 40. The wheeling diode 45 provides a current loop for the inductor 50. The output of the PWM switch 40, the PWM signal Vp, is connected to the inductor 50. The inductor 50 and the capacitor 60 form a filter and generate the master output Vol. The voltage level of the master output Vol is controlled by the pulse width of the PWM signal Vp. To generate the regulated output, the feedback loop will adjust the pulse width of the PWM signal Vp automatically according to the input voltage level and the output load condition of the master output Vol. Not only generating the master output Vol, the PWM signal Vp is also connected to the MA 30 to generate a MA output Vom. According to the voltage level of Vin, the pulse width of the PWM signal and the load condition of Vom, the MA 30 regulates the Vom by blocking a part of the pulse width of the PWM signal Vp, for example the $V_M$ signal in FIG. 2. Therefore the maximum voltage of the MA output Vom would be determined by the pulse width of the PWM signal Vp, if the MA 30 does not block the PWM signal Vp. The apparatus 70 is connected between the master output Vol and the MA output Vom. The voltage-dropper 71 is connected in series with the current-limiter 72. Through the voltage-dropper 71 and current-limiter 72, the master output Vol is linked to the MA output Vom. The voltage-dropper 71 provides a voltage drop. The differential voltage of the master output Vol and the MA output Vom determine the voltage of the voltage-dropper 71. The current-limiter 72 limits the current flows from the master output Vol to the MA output Vom. The feedback of the PWM circuit controls the pulse width of the PWM signal Vp to generate the regulated master output Vol. The MA 30, which is driven by the PWM signal Vp, produces the regulated MA output Vom. When the master output Vol is in no load condition and the slave output Vom is in full load condition, a start-up current will flow from the master output Vol to the MA output Vom via the voltage-dropper 71 and the current-limiter 72. In the mean time, the startup current will widen the pulse width of the PWM signal Vp until the current-limiter 72 limits the current. The current value of the current-limiter 72 is assigned to maintain the minimum pulse width of the PWM signal Vp. This minimum pulse width of the PWM signal Vp ensures that the MA output Vom is inside the regulation. Besides, the current20 limiter 72 protects the voltage-dropper 71 from overload damage.

Figure 4:
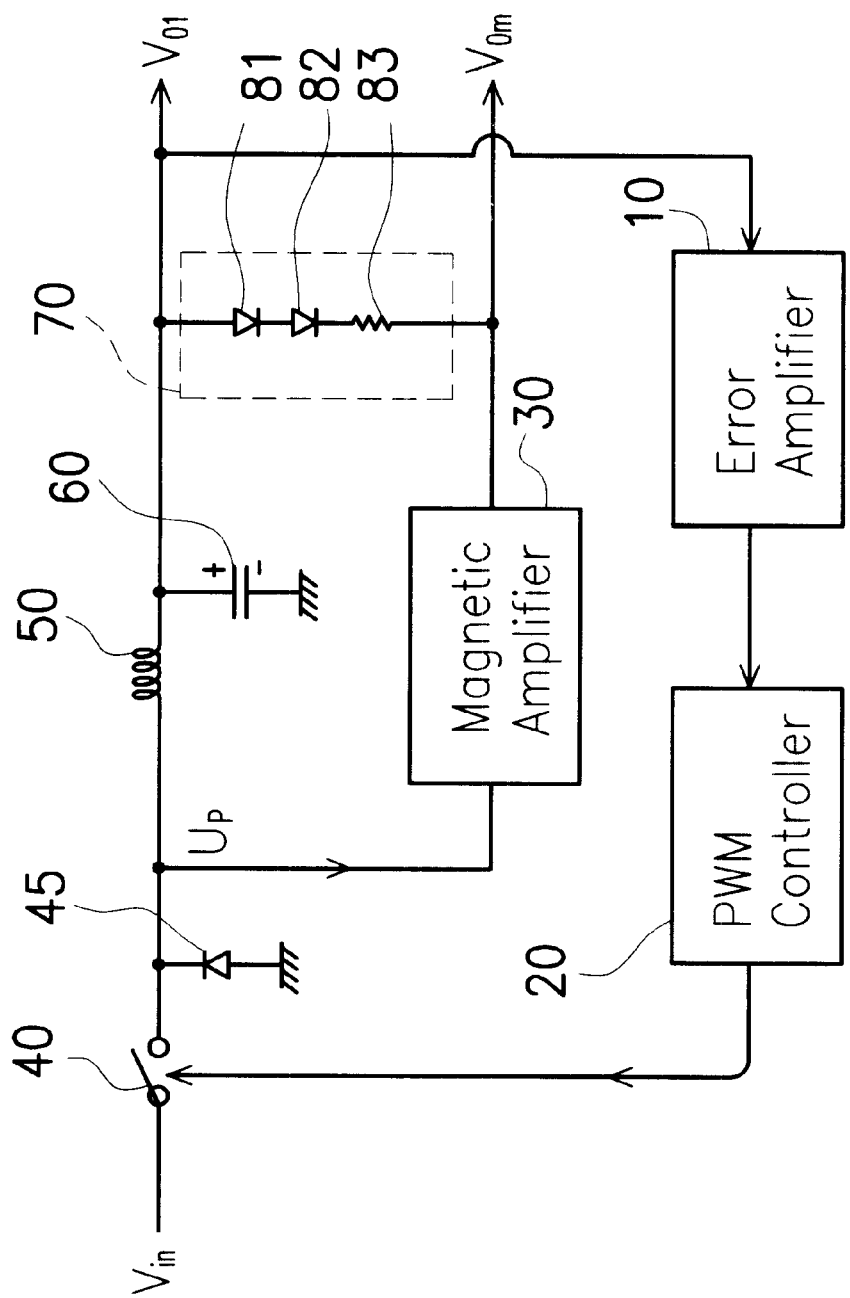
FIG. 4 shows an exemplary circuit of the method and apparatus shown in FIG. 3.

FIG. 4 shows an exemplary circuit of the method and apparatus shown in FIG. 3. A diode 81, a diode 82, and a resistor 85 are connected in series. The anode of the diode 81 links to the master output Vol. The cathode of the diode 81 is connected to the anode of the diode 82. The cathode of the diode 82 is connected to the resistor 85. The resistor 85 is then connected to the MA output Vom. The diode 81 and the diode 82 play the role of voltage-dropper 71. The resistor 85 acts as the current-limiter 72. Take the Vol=5V and Vom=3.3V as an example, the diode 81 and the diode 82 provide a voltage drop of Vf*2; where the Vf is the forward voltage drop of the diode such as 0.7V. The resistor 85 limits the current to I85. Then $$I85=\{[Vol-Vom-(Vf*2)]/R85\};$$

R85 is the resistance of resistor 85. Once the MA output Vom goes down below the 3.3V, the current I85 will increase and more current will be drawn from the master output Vol to the MA output Vom. In the mean time, the pulse width of the PWM signal Vp will be widened which enables the MA output Vom to go up to 3.3V via the MA 30. At that time, the load of the MA is supplied by both of I85 and MA 30.

Figure 5:
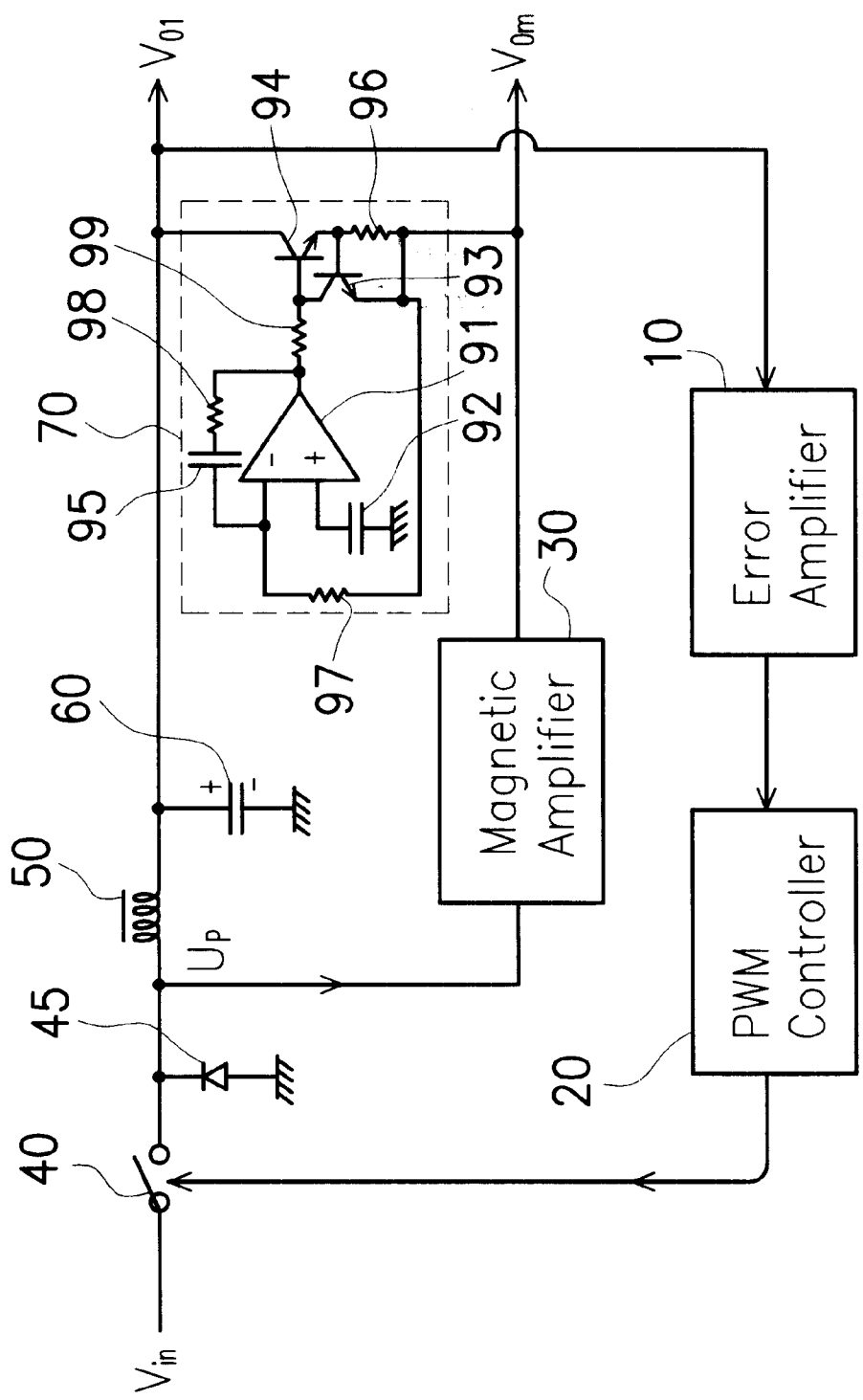
FIG. 5 shows another exemplary circuit of the method and apparatus shown in FIG. 3.

FIG. 5 shows another exemplary circuit of the method and apparatus shown in FIG. 3. The collector of a transistor 94 is connected to the master output Vol. Through a resistor 96, the emitter of the transistor 94 is linked to the MA output Vom. The base of the transistor 94 is driven by the output of an operational amplifier (op amp) 91 via a resistor 99. Through a resistor 97, the negative input of the op amp 91 is connected to the MA output Vom. A reference voltage 92 provides a reference voltage for the positive input of the op amp 91. The reference voltage is equal to the voltage of MA output Vom. A resistor 98 connects with a capacitor 95 in series providing the frequency compensation for op amp 91. The op amp 91 cooperates with the transistor 94 to play a role of the voltage-dropper. The collector of a transistor 93 connects to the base of the transistor 94. The resistor 96 is connected between the base and the emitter of the transistor 93, in which the transistor 93 will be turned on and the transistor 94 will be turned off linearly, once the voltage of the resistor 96 is higher than the threshold voltage of the transistor 93. The resistor 96 cooperates with the transistor 93 to play a role of the current-limiter.

As described above, the method and apparatus of the present invention can reduce the minimum load requirement of power supply.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for a magnetic amplifier to reduce the minimum load requirement of a power supply, comprising:
    a voltage-dropper for providing a voltage drop, wherein an anode of the voltage-dropper is coupled to a master output of the power supply; and
    a current-limiter providing a current limit, in which the current-limiter is coupled with the voltage-dropper in series, and an output of the current-limiter is coupled to an output of the magnetic amplifier of the power supply.

2. The apparatus for the magnetic amplifier as claimed in claim 1, wherein said voltage-dropper generates a voltage drop, which is the differential voltage of the master output and the magnetic amplifier output.

3. The apparatus for the magnetic amplifier as claimed in claim 1, wherein said current-limiter provides the current limit, which provides the overload protection for the voltage-dropper and maintains a minimum pulse width of the PWM signal to ensure that the output of the magnetic amplifier is inside the regulation.

4. The apparatus for the magnetic amplifier as claimed in claim 1, wherein the voltage-dropper and the current-limiter form a circuit comprising:
    a first diode associated with a second diode for acting as the voltage-dropper, wherein the anode of the first diode is connected to the master output; and
    a slope resistor for acting as the current-limiter, wherein the first diode, the second diode and the slope resistor are connected in series; the slope resistor is coupled to the output of the magnetic amplifier.

5. The apparatus for the magnetic amplifier as claimed in claim 1, wherein the voltage-dropper and the current-limiter form a circuit comprising:

a first transistor associated with an operational amplifier playing a role of the voltage-dropper, in which the operational amplifier drives the base of the transistor, the collector of the transistor is connected to the master output, and the negative input of the operational amplifier is coupled to the output of the magnetic amplifier;

a limit resistor associated with a second transistor playing a role of the current-limiter, in which the limit resistor is connected between the base and the emitter of the second transistor, the collector of the second transistor is tied to the base of the first transistor, the base of the second transistor is connected to the emitter of the first transistor, and the emitter of the second transistor is attached to the output of the magnetic amplifier; and a reference voltage connecting to the positive input of the operational amplifier, wherein the voltage of the reference voltage is equal to the output voltage of the magnetic amplifier.

6. A method for a magnetic amplifier to reduce the minimum load requirement of a power supply, comprising the steps of:

providing a voltage drop by a voltage-dropper of which the anode is coupled to a master output of the power supply; and providing a current limit by a current-limiter which is coupled with the voltage-dropper in series, and the output of the current-limiter is coupled to the output of the magnetic amplifier of the power supply.

* * * * *